US011125246B2

(12) United States Patent
Pavlovskiy (10) Patent No.: US 11,125,246 B2
(45) Date of Patent: Sep. 21, 2021

(54) INDUSTRIAL AIR BLOWER CASE (71) Applicant: Alexander Pavlovskiy, Kent, WA (US)

(72) Inventor: Alexander Pavlovskiy, Kent, WA (US)

(*) Notice: Subject to any disclaimer, the term of this patent is extended or adjusted under 35 U.S.C. 154(b) by 296 days.

(21) Appl. No.: 16/430,056

(22) Filed: Jun. 3, 2019

(65) Prior Publication Data
US 2020/0377134 A1 Dec. 3, 2020

(51) Int. Cl.
F04D 29/40 (2006.01)
F04D 29/66 (2006.01)
B62B 1/12 (2006.01)

(52) U.S. Cl.
CPC ............ F04D 29/403 (2013.01); B62B 1/125 (2013.01); F04D 29/664 (2013.01)

(58) Field of Classification Search
CPC ............ F04D 29/403; F04D 29/4206; F04D 29/4226; F04D 29/664; B62B 1/125; B62B 2204/00; B62B 2204/06
See application file for complete search history.

(56) References Cited

U.S. PATENT DOCUMENTS

| 4,150,913 | A | * | 4/1979 | Davis | F04D 29/30 |
| | | | | | 415/119 |
| 4,264,282 | A | * | 4/1981 | Crago | F04C 29/066 |
| | | | | | 181/202 |
| 5,567,127 | A | | 10/1996 | Wentz | |
| 5,672,052 | A | * | 9/1997 | Ishida | F04C 29/066 |
| | | | | | 417/312 |
| 6,793,465 | B2 | * | 9/2004 | Stallings | F04B 39/0033 |
| | | | | | 417/312 |
| 8,702,379 | B2 | | 4/2014 | Frater et al. | |
| 9,063,405 | B2 | | 6/2015 | Clawson et al. | |
| 2003/0150327 | A1 | * | 8/2003 | Bolden | B01D 46/0013 |
| | | | | | 95/273 |
| 2006/0162343 | A1 | * | 7/2006 | Van Loon | F25D 19/003 |
| | | | | | 62/3.61 |
| 2016/0356035 | A1 | * | 12/2016 | Laney | E04B 1/7092 |
| 2019/0112053 | A1 | * | 4/2019 | Melin | F04D 29/281 |

OTHER PUBLICATIONS https://www.stanmech.com/articles/regenerative-versus-centrifugal-blowers-what-are-they-and-when-do-i-use-what.
https://www.enoisecontrol.com/case-studies/industrial-fan-noise/.

* cited by examiner

Primary Examiner — Ryan A Reis
(74) Attorney, Agent, or Firm — Anthony Claiborne (57) ABSTRACT A case for an industrial air blower provides noise-reducing foam baffles and vibration absorbing ductile mounting components, mitigating the substantial noise and vibration generated by the blower in operation. Configurable for use of the blower either as pressurized air supply or vacuum source, the case provides circulation of blower inlet air or vacuum outlet air around the blower motor, thereby aiding cooling of the blower motor, reducing the risk of overheating. When configured for use as a pressurized air supply, blower inlet air is heated by the blower motor, the blower thereby providing a heated pressurized air supply suitable for drying wet or water damaged surfaces. Embodiments provide caster wheels and handles for easy transport. Embodiments also provide a pressure relief valve or manometer cut-off to prevent blower overload from excessive pressure.

13 Claims, 8 Drawing Sheets

INDUSTRIAL AIR BLOWER CASE

BACKGROUND OF THE INVENTION

Field of the Invention

This invention relates to industrial air blowers. More specifically, this invention relates to a case for an industrial air blower that provides the blower with enhanced transportability, reduced noise and vibration and improved air flow for cooling the blower motor.

Description of the Related Art

Industrial blowers are machines whose primary function is to provide a flow of air. Blowers may be used either to provide a positive flow of pressurized air or to provide negative air pressure and thereby serve as a vacuum device. A blower comprises a motor-driven rotating impeller in a housing having inlet and outlet ports. One principal type of industrial blower is the regenerative blower, characterized by a configuration in which the inlet and outlet ports are parallel, with both ports positioned perpendicular to the rotation of the impeller. Regenerative blowers are used especially for applications requiring a supply of high pressure, low flow air. Such blowers are widely used for temporary purposes in manufacturing and construction, applications in which blower transportability is important.

Industrial blowers can produce considerable noise and vibration. Unmitigated low to mid-frequency noise levels can be as high as 90 dbA at 5 feet from a blower. Attempts to reduce blower noise have included removable sound blanket wraps and sound curtain systems that completely enclose the blower motor. Such approaches, however, have significant limitations. Wraps and curtain systems can limit or even prevent portability of the blower. Further, both blanket wraps and curtain systems can restrict air flow around the blower motor, causing heat from the motor to accumulate in the ambient air surrounding the blower motor, potentially leading to overheating and motor failure.

What is needed is a device that reduces blower noise. What is further needed is such a device that not only does not restrict, but instead enhances blower portability. Yet further, what is needed is such a device that meets these needs while also enhancing air flow around the blower motor.

SUMMARY OF THE INVENTION

A case for an industrial air blower provides noise-reducing foam baffles and vibration absorbing ductile mounting components to mitigate noise and vibration generated by the blower in operation. Configurable for use of the blower either as pressurized air supply or vacuum source, the case design enables easy transport of the case with an enclosed blower.

The case has a floor configured to affix a blower on ductile stand-offs. A ventilation opening is provided in the case floor. The case further comprises vertical walls affixed to the floor. A top is affixed to the vertical walls, the top and the walls lined with sound-absorbing material such as XTREME DYNAMAT® from Dynamat Control of North America, Inc. in Hamilton, Ohio. The floor, the walls and the top of the case thereby form an acoustic enclosure for a blower. In one embodiment for a regenerative blower, one wall of the case has a first and a second orifice, configured to align with the outlet and the inlet ports respectively of the blower affixed to the floor of the case. Embodiments for other blower configurations may place the first orifice in one wall and the second orifice in another wall. In any case, the floor is configured to affix the appropriate blower in such a position as to provide a gap (1 to 15 centimeters in preferred embodiments) between the wall of each orifice and its corresponding port in the blower.

In use of the case with the blower to provide pressurized air, a nipple is inserted through the first orifice in the wall, passing through the gap between the orifice and the outlet port of the blower, the inserted end of the nipple threadedly engaging with the blower outlet port while the other end of the nipple extends out of the case wall, a gasket hermetically sealing the nipple against the exterior of the wall. A plug is inserted into the second orifice to form a hermetic seal. An air hose may then be connected to the nipple extending from the case wall.

Similarly, in use of the case with the blower to serve as a vacuum, the nipple is inserted through the second orifice in the wall, passing through the gap to threadedly engage the inlet port of the blower, leaving an end of the nipple extending out of the case wall, hermetically sealed to the case wall with a gasket. In this configuration, the plug is inserted into the first orifice to form a hermetic seal. A vacuum hose may then be connected to the extending nipple.

Embodiments mitigate the risk to the blower of dangerous over- or under-pressure by providing a protective means for lowering transported air pressure or ceasing blower operation altogether. Such means may comprise a pressure relief valve disposed on the nipple used to connect pressure or vacuum hose to the blower port. Alternatively, such means may include a manometer sensor electronically communicating a signal of excessive over- or under-pressure to a controller that, in response to such signal, causes the blower to reduce or cease operation.

Embodiments enhance portability of the case-blower combination by providing a horizontal bar disposed between upper extensions of two opposing vertical wells above the case top, the bar serving as a handle for transporting the assembly. In some embodiments, portability is further enhanced by providing caster wheels depending below two adjacent corners of the floor, the other two corners of the floor affixed to depending corresponding bumpers. Some such embodiments may have a telescoping handle affixed to the wall extending above the casters, as is familiar to users of airport luggage, whereby the telescoped handle is used as a lever to tilt the case-blower assembly up on the caster wheels as fulcrum, the assembly then wheelable in the same manner as a wheeled suitcase.

Embodiments further enhance portability by providing a means for stowing a long power cord for the blower on the case. Specific embodiments fashion two parallel walls of the case to extend beyond the case top in a waisted, roughly hour-glass shape. In such embodiments, the power cord is coiled and retained between the extended walls at the waist of the hour-glass shape.

BRIEF DESCRIPTION OF THE DRAWINGS

Objects of the present invention as well as advantages, features and characteristics, in addition to methods of operation, function of related elements of structure, and the combination of parts and economies of manufacture, will become apparent upon consideration of the following description and claims with reference to the accompanying drawings, all of which form a part of this specification, wherein like reference numerals designate corresponding parts in the various figures, and wherein:

DETAILED DESCRIPTION OF THE INVENTION

Figure 1:
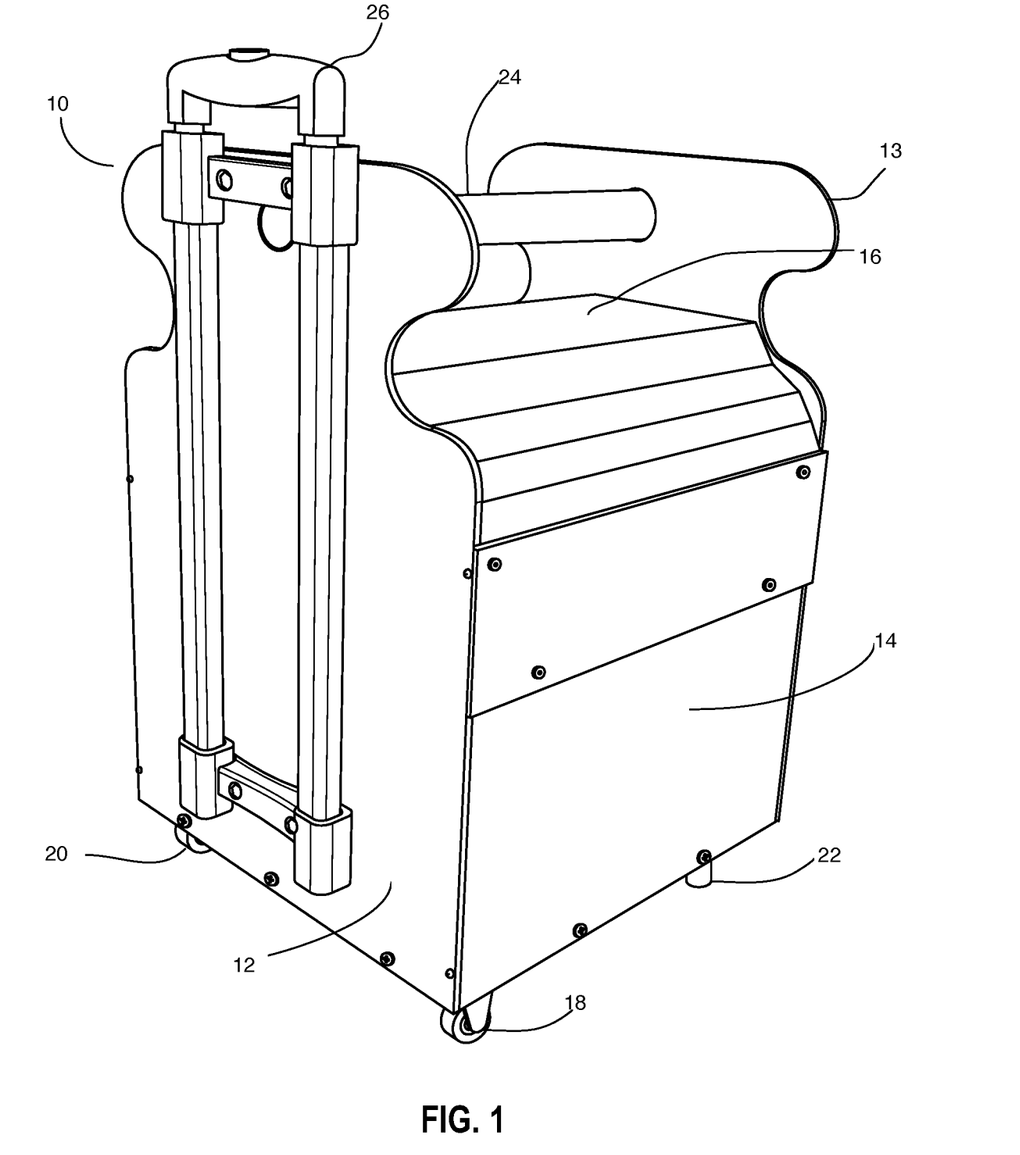
FIG. 1. is an elevation view of an embodiment of the case having a telescoping handle, shown here in the down position.
Figure 5:
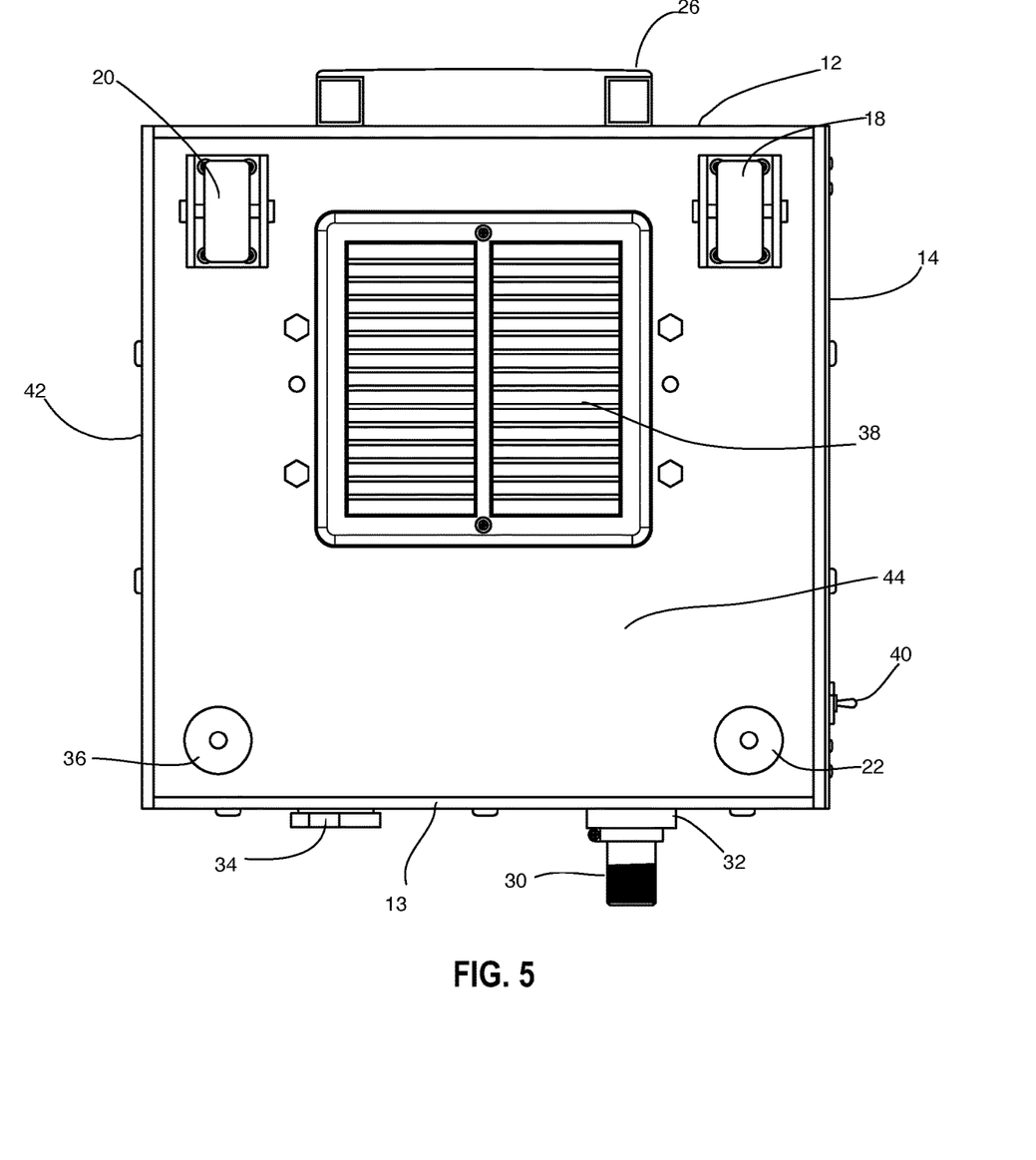
FIG. 5 is a depiction of the underside of the floor of the case in one embodiment, showing the ventilation opening, the depending caster wheels and corresponding depending bumpers, the bottom of the telescoping bumper on one wall and the nipple and plug inserted into the orifices in the opposite wall.

Turning now to the drawings, FIG. 1 depicts an elevation view of an embodiment of the invention. Case 10 is comprised of walls 12, 13, 14 (and a fourth wall not visible in this view), a top 16, and a floor underneath (not visible in this view—see floor 44 in FIG. 5). Depending from the floor are two caster wheels 18, 20 and two bumpers (one bumper 22 is shown while the other bumper 36 in FIG. 5 is not visible in this view). The depicted embodiment has a horizontal handle bar 24 for carrying the case with blower installed therein. This embodiment further has a telescoping handle 26, shown here in the contracted position.

Figure 2:
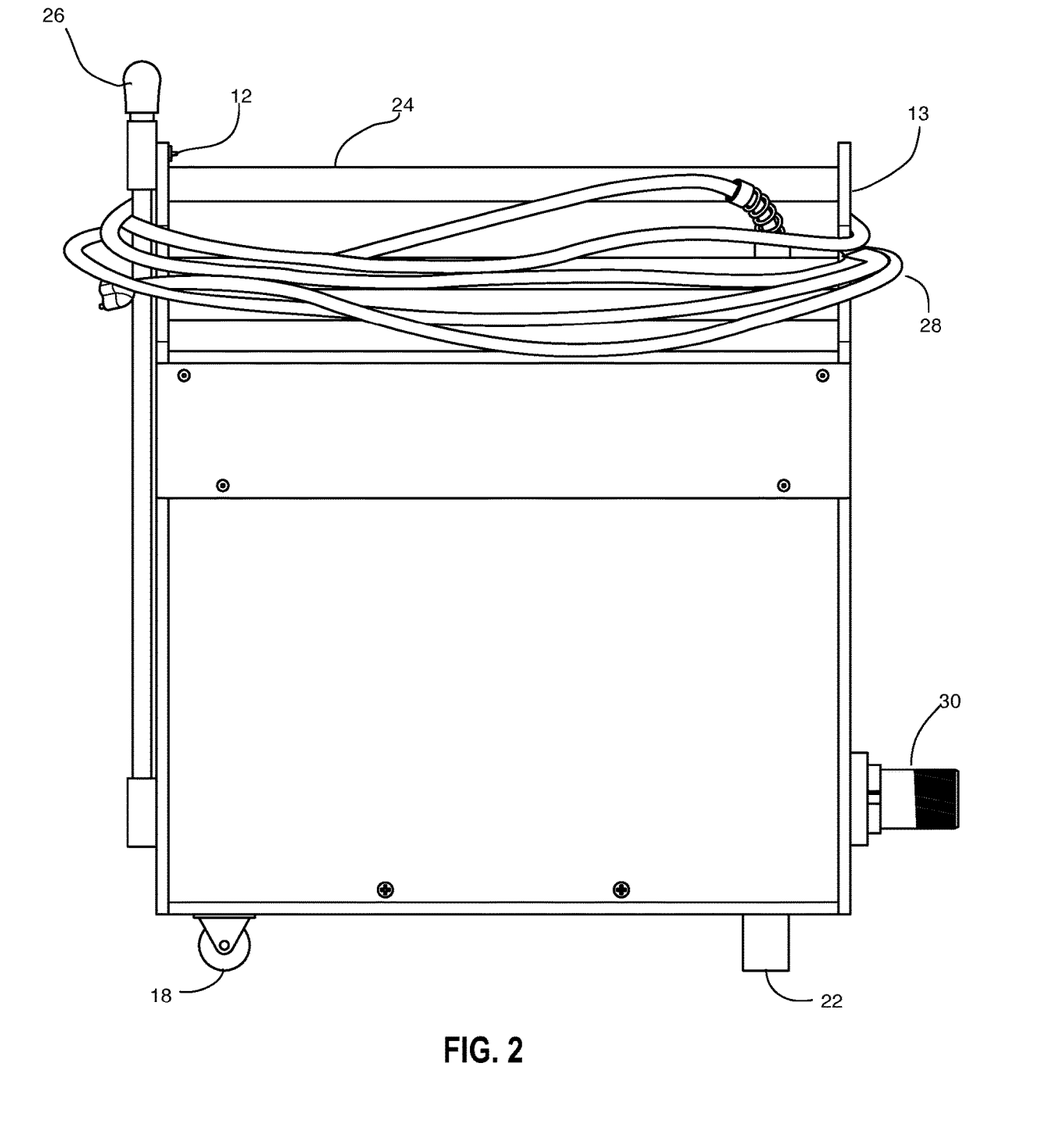
FIG. 2 is a side view of an embodiment of the case having a telescoping handle in the down position, depicting a power cord coiled between extended opposite walls and further depicting a threaded nipple inserted in an orifice on the right.

FIG. 2 depicts a side view of an embodiment of the invention as in FIG. 1 but having a power cord 28 coiled between walls 12, 13. Also shown is threaded nipple 30 which has been inserted into an orifice (orifice 46 in FIG. 6) in wall 13.

Figure 3:
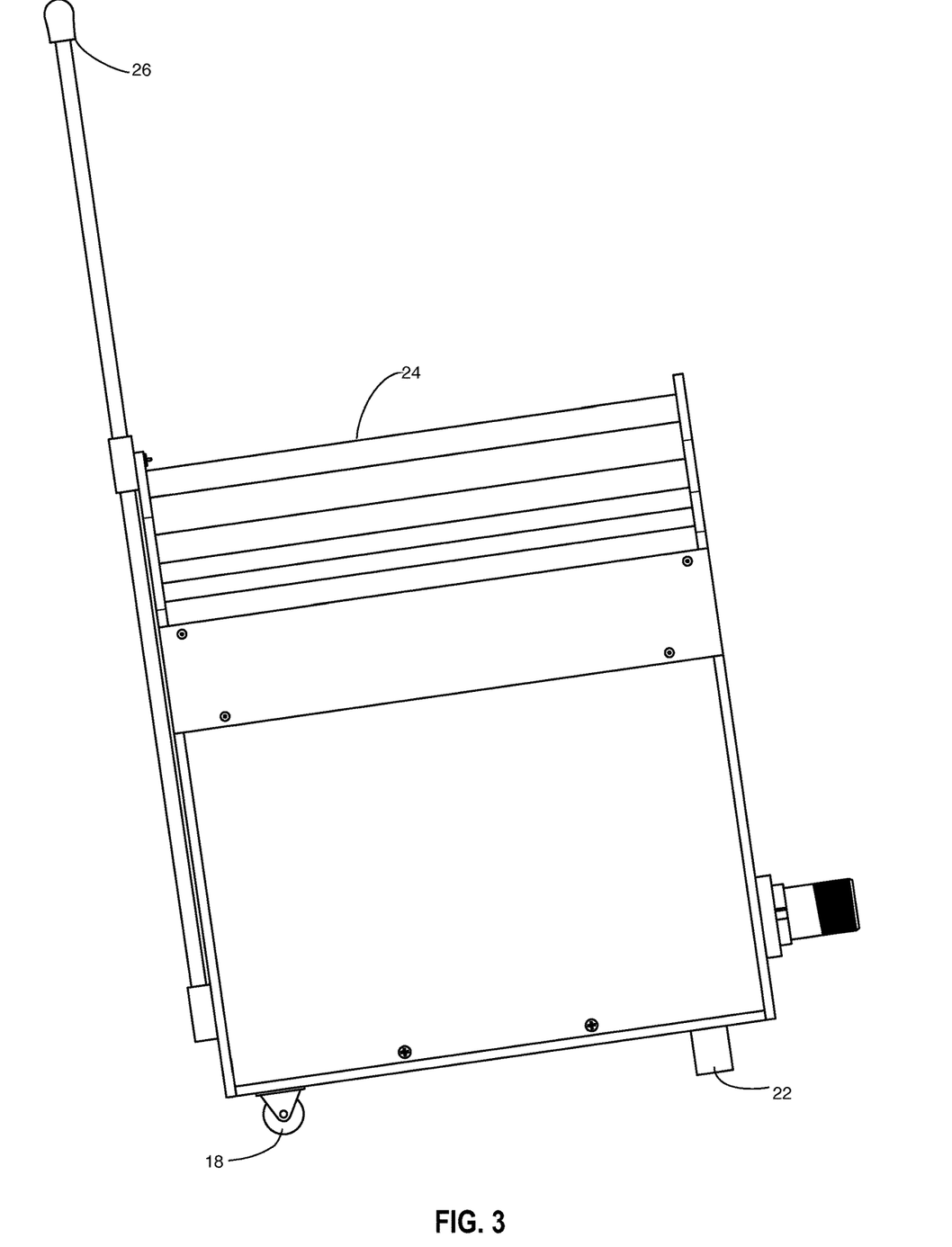
FIG. 3 is a side view of the same embodiment depicted in FIG. 2 but with telescoping handle extended and tilting the case assembly up on the depicted caster wheels.

FIG. 3 depicts another side view of the embodiment of the invention, in which telescoping handle 26 has been extended and used as a lever to tilt the case 10 with blower installed upon caster wheels 18, 20, lifting up bumpers 22 (and 36 as in FIG. 5), enabling transportation of the assembly.

Figure 4:
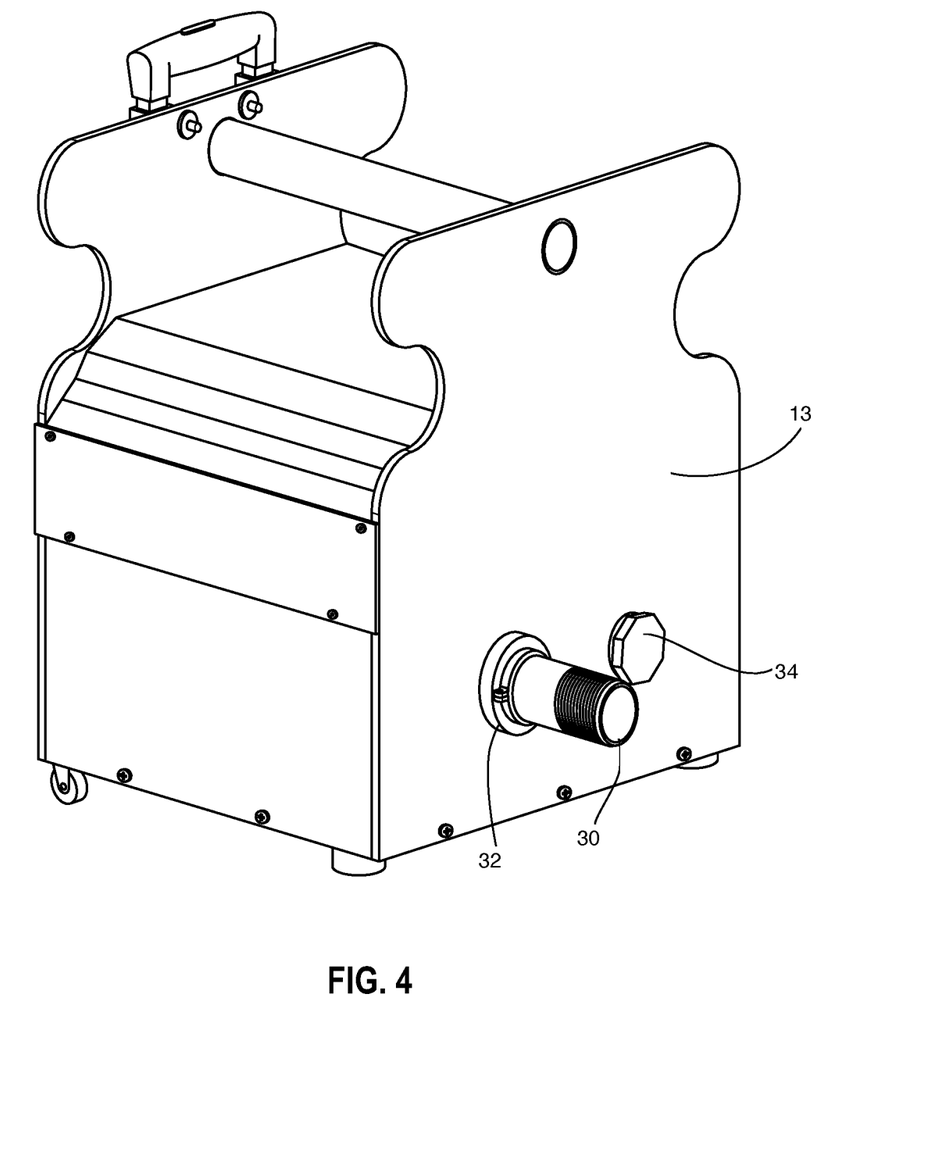
FIG. 4 is an elevation view of an embodiment of the case showing the wall with first and second orifices, a threaded nipple inserted into the first orifice and a plug inserted into the second orifice.

FIG. 4 depicts another elevation view of the embodiment shown in FIG. 1, this time from the perspective of wall 13. Disposed in wall 13 are nipple 30, hermetically sealed against wall 13 with gasket 32. Disposed in wall 13 also is plug 34.

FIG. 5 depicts an underside view of case 10, showing floor 44 affixed to walls 12, 13, 14, 42. Disposed in floor 44 is ventilation opening 38. As in FIGS. 1-4, telescoping handle 26 is affixed to wall 12. Caster wheels 18, 20 and bumpers 22, 36 depend from floor 44. Threaded nipple 30, hermetically sealed with gasket 32, is shown disposed within wall 13, as is plug 34. A toggle switch 40 is shown installed in wall 14 for switching power to the blower motor.

Figure 6:
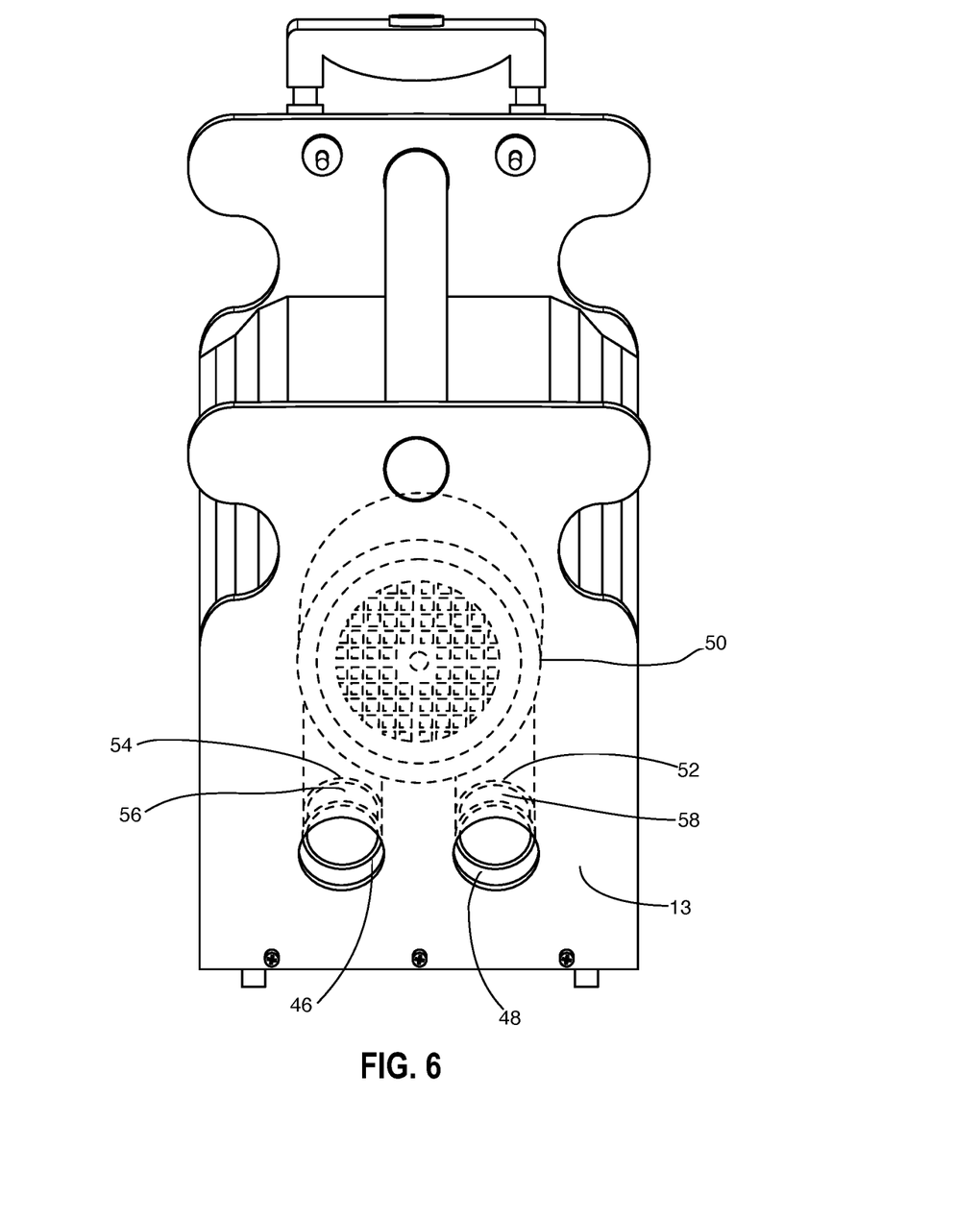
FIG. 6 is a perspective of an embodiment of the case from the view of the wall having orifices, showing in dotted lines a portion of the blower disposed within the case.

FIG. 6 is a perspective view of case 10 as seen from wall 13, indicating by dotted lines a regenerative blower 50 retained inside case 10. Blower 50 has inlet port 52 and outlet port 54. Within wall 13 are orifices 46, 48, aligning with blower ports 54, 52, for receiving threaded nipple 30 and plug 34. Significantly, blower 50 is affixed to floor 44 of case 10 so that a gap 56, 58 is left between wall 13 and ports 54, 52.

Figure 7:
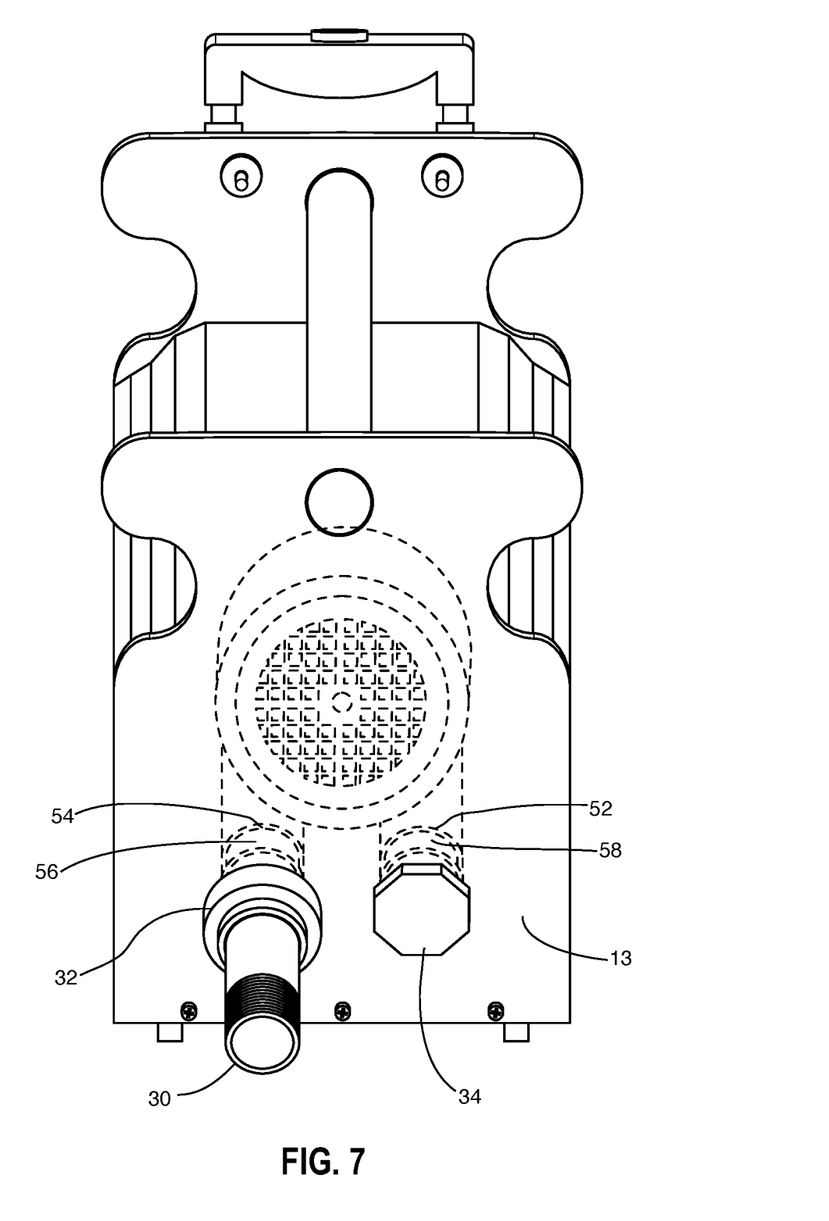
FIG. 7 is the same perspective view as FIG. 6, showing the threaded nipple and the plug in place in the orifices in the wall, illustrating that the nipple spans the gap between the wall and the blower port to which the nipple is connected, while the plug leaves the gap open between the wall and the other blower port.

FIG. 7 is the same perspective as FIG. 6, but now with threaded nipple 30 and plug 34 inserted into orifices 46, 48. In this depiction, case 10 is configured to provide a flow of air under positive pressure through threaded nipple 30. Threaded nipple 30 spans gap 56, threadedly to engage with outlet port 54. Gasket 32 hermetically seals threaded nipple 30 against wall 13. Plug 34 is inserted into orifice 38, leaving gap 58 open between blower inlet port 52 and wall 13.

Figure 8:
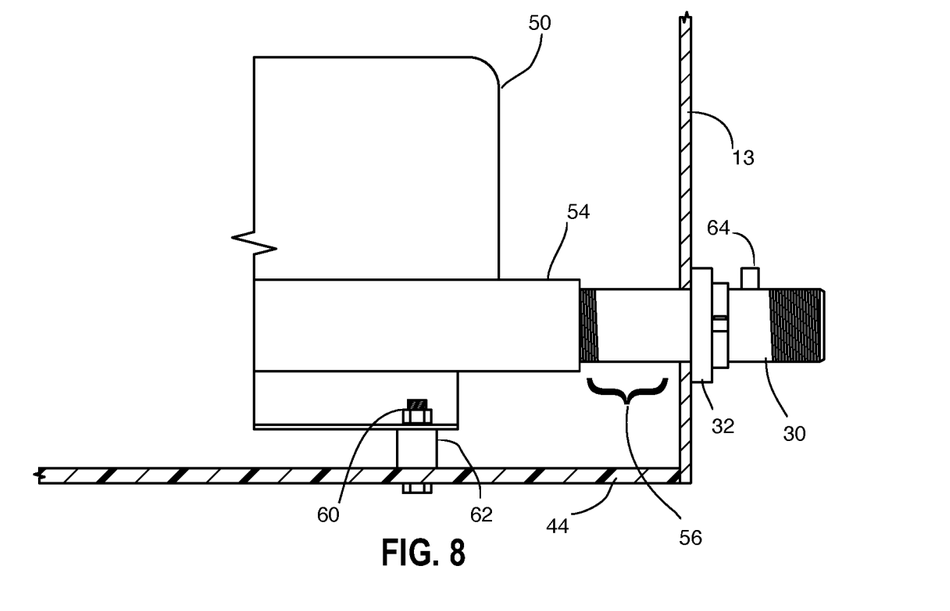
FIG. 8 is a cross-sectional side view of the nipple connected across the gap to the blower port, depicting a ductile stand-off connecting the blower to the floor, the gasket hermetically sealing the nipple to the case wall, and a pressure relief valve or manometer for preventing over- or under-pressure on the blower.

FIG. 8 is a cross-sectional side view, again of a configuration of case 10 to provide a flow of air under positive pressure, showing threaded nipple 30 spanning from wall 13 across gap 56 to engage with outlet port 54 of blower 50. Gasket 32 hermetically seals nipple 30 against wall 13. In this embodiment, protective means 64 is installed in nipple 30 for avoiding damaging over- or under-pressure of the blower. Blower 50 is secured to floor 44 with bolt 60 atop ductile stand-off 62. While not visible in this drawing, in this configuration plug 34 is inserted into orifice 48 leaving gap 58 open between wall 13 and inlet port 52.

The configuration depicted in FIGS. 7 and 8 provides positive air flow through nipple 30 by drawing air through ventilation opening 38 in floor 44 into the ambient air within case 10, through blower inlet port 52, and thence out of blower outlet port 54 into nipple 30. This flow of ambient air through case 10 serves to remove heat from the motor of blower 50, thereby mitigating potential motor overheating and shutdown. Pressurized air thus heated may be more effective for certain blower applications, for example in desiccation of materials such as drywall.

The assembly of case 10 with blower 50 may be easily reconfigured by the user to provide negative pressure and thereby serve as a vacuum device. In such a configuration, threaded nipple 30 is inserted into orifice 48 to span gap 58 and threadedly engage inlet port 52 of blower 50. Threaded nipple 30 is hermetically sealed against wall 13 by gasket 32. Plug 34 is inserted into orifice 46, leaving gap 56 open between wall 13 and blower outlet port 54. In operation in this configuration, air is sucked in through nipple 30 into inlet port 52 and then blown out of outlet port 54 into gap 56, entering the ambient airspace of case 10 and exiting through ventilation opening 38 in floor 44. Again, this flow of ambient air through case 10 serves to cool the motor of blower 50 and mitigate potential motor overheating.

While the embodiments of the case depicted herein have been discussed in relation to regenerative blowers, persons of skill in the art will recognize that a case can be fashioned for a centrifugal blower while still keeping with the spirit of this invention. In contrast to regenerative blowers, centrifugal blowers are configured so that the inlet and outlet ports are perpendicular, with the inlet port feeding air into the center of the blower impeller and the outlet port tangential to the rotation of the impeller. Accordingly, a case for a centrifugal blower in accordance with this invention may be fashioned in which the orifice corresponding to the inlet port will be on a wall of the case that is perpendicular to the wall on which the orifice corresponding to the outlet port is located.

Persons of skill in the art will readily acknowledge other variations of elements that are still consonant with the teachings of the present invention. For example, the two bumpers opposite the caster wheels can themselves be replaced with caster wheels, enabling 360 degree mobility and transportability. By way of another example, instead of having a telescoping handle, the case may be outfitted with a dolly-like handle in the manner of a shopping cart. In yet another example, instead of the arrangement whereby a power cord for the assembly is coiled horizontally between opposing wall sections across the top of the case, a cleat for coiling the cord can be affixed to one of the walls. Alternatively, the case may employ a manual, semi-automatic or automatic winch for stowing the power cord, such as that which is familiar to users of cannister vacuum cleaners.

While the invention has been described with a certain degree of particularity, it should be recognized that elements thereof may be altered by persons skilled in the art without departing from the spirit and scope of the invention. Accordingly, the present invention is not intended to be limited to the specific forms set forth in this specification, but on the contrary, it is intended to cover such alternatives, modifications and equivalents as can be reasonably included within the scope of the invention. The invention is limited only by the following claims and their equivalents.

I claim:

1. A case for a blower, the blower being regenerative and having ports consisting of an inlet port and an outlet port, the case comprising
    a floor configured to retain the blower,
    a plurality of substantially vertical walls affixed to the floor,
        one of the walls punctuated with a first orifice oriented to align with the inlet port of the blower,
        the same one of the walls punctuated with a second orifice oriented to align with the outlet port of the blower,
    wherein the floor is further configured to retain the blower with a horizontal gap of 1 to 15 centimeters between the ports of the blower and the wall punctuated by the orifices,
    a nipple inserted into one of the first orifice and the second orifice, the nipple bridging the horizontal gap between the wall punctuated by the orifices and a port of the blower, the nipple configured to threadedly engage the port of the blower,
    a gasket hermetically sealing the nipple against the wall punctuated by the orifices,
    a plug removably inserted into the other of the first orifice and the second orifice, the plug configured to hermetically seal that orifice,
    the case further comprising a top affixed to the walls, and a ventilation opening.

2. The case according to claim 1, further comprising sound absorbing material lining the case interior.

3. The case according to claim 1, wherein the floor is further configured to retain the blower on ductile stand-offs.

4. The case according to claim 1 comprising at least four walls, wherein two of the walls are parallel and extend upward above the top, and further comprising a horizontal handle bar for carrying the case, the horizontal handle bar affixed to and spanning the two parallel walls above the top.

5. The case according to claim 1, further comprising at least two caster wheels affixed to and depending from the floor.

6. The case according to claim 5, further comprising a handle affixed to one of the walls.

7. The case according to claim 6, wherein the handle is telescoping.

8. The case according to claim 1, further comprising a power cord for supplying power to the blower and a means for stowing the power cord.

9. The case according to claim 1, further comprising a means for mitigating risk of excessive pressure differential between the inlet port and the outlet port of the blower.

10. The case according to claim 9, wherein the means for mitigating risk of excessive pressure differential comprises a pressure relief valve disposed on the nipple.

11. The case according to claim 9, wherein the means for mitigating risk of excessive pressure differential comprises a manometer disposed on the nipple, the manometer connected to a controller, the controller configured to attenuate operation of the blower when the manometer indicates excessive pressure differential.

12. A case for a blower, the blower being centrifugal and having ports consisting of an inlet port and an outlet port, the case comprising:
    a floor configured to retain the blower,
    at least four vertical walls affixed to the floor, the walls comprising
        a first wall, punctuated with a first orifice aligned with the inlet port of the blower, and
        a second wall perpendicular to the first wall, punctuated with a second orifice aligned with the outlet port of the blower,
    wherein the floor is further configured to retain the blower with a first horizontal gap of 1 to 15 centimeters between the first wall and the inlet port of the blower and a second horizontal gap of 1 to 15 centimeters between the second wall and the outlet port of the blower,
    a nipple inserted into one of the first orifice and the second orifice, the nipple bridging that horizontal gap between the wall punctuated by the one of the orifices and the port of the blower aligned with the one of the orifices, the nipple configured to threadedly engage the port of the blower,
    a gasket hermetically sealing the nipple against the wall punctuated by the one of the orifices,
    a plug removably inserted into the other of the first orifice and the second orifice, the plug configured to hermetically seal the orifice,
    the case further comprising a top affixed to the walls, and a ventilation opening.

13. The case according to claim 12, further comprising a means for mitigating risk of excessive pressure differential between the inlet port and the outlet port of the blower.

* * * * *